Patented Aug. 24, 1937

2,090,948

UNITED STATES PATENT OFFICE 2,090,948

ALIPHATIC ACYLAMINO-AMINO ANTHRAQUINONE DERIVATIVES

George Reeves, Henry Charles Olpin, and George Holland Ellis, Spondon, near Derby, England, assignors to Celanese Corporation of America, a corporation of Delaware No Drawing. Application August 14, 1935, Serial No. 36,134. In Great Britain September 27, 1934

10 Claims. (Cl. 260—60)

This invention relates to improvements in the manufacture of organic compounds, and particularly to improvements in the manufacture of monoacetyl-1,4-diamino-anthraquinone and other amino-anthraquinone derivatives which contain acidylamino groups and free amino groups.

The standard method for the manufacture of monoacetyl-1,4-diamino-anthraquinone is the acetylation of mono-α-amino-anthraquinone, followed by nitration and subsequent reduction of the product, and it is necessary to carry out the operation with great care in order to avoid hydrolysis of the acetyl group.

It has now been discovered that monoacetyl-1,4-diamino-anthraquinone and other acidylated amino-anthraquinones which contain free amino groups may be produced very simply by the manufacture of the product directly from the corresponding di- or poly-amino-anthraquinone.

According to the present invention the manufacture of an amino-acidylamino-anthraquinone is effected by converting the corresponding di- or poly-amino-anthraquinone into a compound containing both acidylamino and free amino groups by a process comprising an acidylation step.

In putting the invention into practice the acidylation may be carried beyond the desired stage, and the acidyl content of the compound formed subsequently reduced by hydrolysis to the desired value, or the acidylation may be interrupted when a compound of the desired acidyl content is obtained.

An important application of the invention is in the manufacture of monoacetyl-1,4-diamino anthraquinone, but the invention may be applied to the production of other acidyl amino-anthraquinones containing one or more free amino groups, in particular compounds in which the acidyl groups are radicles of lower fatty acids.

In the manufacture of monoacetyl-1,4-diamino anthraquinone, 1,4-diamino anthraquinone is the starting material and the acetylation thereof may be effected with any suitable acetylating agent, for example glacial acetic acid or acetic anhydride or mixtures thereof or acetyl chloride. Acetylation with acetyl chloride is preferably carried out in presence of a basic substance, e. g. pyridine, which will react with the hydrogen chloride evolved, together with a suitable diluent. As above indicated acetic anhydride and glacial acetic acid may be used together or separately and may be used with or without a diluent. In a similar manner the introduction of acidyl groups other than acetyl may be effected with the aid of the corresponding acid in concentrated form, its anhydride or its chloride.

When it is desired to produce the acidylamino-anthraquinone by interrupting the acidylation as soon as the desired stage has been reached, it is preferable to employ as the sole acidylating agent the organic acid, the radicle of which is to be introduced into the amino anthraquinone, as it has been found that by this means a very close control of the acidylation is rendered possible. Thus in the production of monoacetyl-1,4-diamino anthraquinone or other acetylamino-anthraquinones acetylation is preferably effected by means of glacial acetic acid as the sole acetylating agent.

The production of the acidylamino-anthraquinone by controlled hydrolysis of a more highly acidylated amino-anthraquinone compound is most suitably effected by means of concentrated sulphuric acid at a low temperature, and in particular a temperature not exceeding about 10° C. Under these conditions the hydrolysis can be caused to extend over a considerable period so that a slight variation in the time at which it is interrupted produces very little effect upon the products obtained with different batches. It should be remarked that this form of the invention is not limited to the formation and hydrolysis of a fully acidylated amino-anthraquinone, and that where a compound which is not fully acidylated but which contains a higher acidyl content than is desired in the final product is easily obtainable, this compound may be subjected to the process of controlled hydrolysis. Likewise mixtures of different acidylamino anthraquinones may be subjected to controlled hydrolysis, for example, if, with the particular acetylation process employed a mixture containing, besides 1,4-diacetylamino-anthraquinone, considerable quantities of monoacetyl-1,4-diamino-anthraquinone is obtained, this mixture may be subjected to hydrolysis to produce a product consisting substantially of monoacetyl-1,4-diamino-anthraquinone. In this latter case it may, however, be advantageous to effect the hydrolysis at a rather low temperature, for example a temperature not exceeding 7 or 8° C.

The following examples serve to illustrate the present invention as applied to the manufacture of monoacetyl-1,4-diamino anthraquinone, but it is to be understood that these examples are in no way limitative.

Example 1

1,4-diamino anthraquinone is refluxed gently for 40 to 50 hours with about 10 times its weight of glacial acetic acid. The acetylation mixture is then allowed to cool and is filtered. The filtrate is poured into about 8 times its weight of water and the precipitated monoacetyl-1,4-diamino anthraquinone is separated, washed and dried.

Example 2

1,4-diamino-anthraquinone is acetylated by boiling with about 5 times its weight of a mixture of equal parts of acetic acid and acetic anhydride. The acetylation mixture is cooled and the crystalline 1,4-diacetylamino anthraquinone produced is filtered off.

The 1,4-diacetylamino anthraquinone is dissolved in about 20 times its weight of concentrated sulphuric acid, the temperature during solution of the compound being maintained at about 10° C. The mixture is then maintained at a temperature of 10 to 11° C. with mechanical stirring for a period of about 5 to 7 hours after which the monoacetyl-1,4-diamino anthraquinone produced is precipitated by dilution in an excess of water.

The monoacetyl - 1,4 - diamino anthraquinone obtained in either of the above examples gives excellent dyeings on cellulose acetate materials, which are indistinguishable from those obtained with monoacetyl diamino-anthraquinone obtained by the method commonly employed and referred to above.

It will be appreciated that the process of the present invention enables monoacetyl-1,4-diamino-anthraquinone and other acidyl-amino-anthraquinones containing one or more free amino groups to be obtained in an exceedingly simple manner. Furthermore, the control which it is necessary to exercise over the reactions involved is such as to be of easy attainment even when carrying out the process on a large scale. In this connection the invention presents considerable advantage over the method commonly employed for preparing compounds of the type in question.

While the invention has been described with particular reference to the manufacture of monoacetyl-1,4-diamino-anthraquinone, it may, as has been stated above, also be employed in the manufacture of other amino-acidylamino-anthraquinones, particularly from α-amino-anthraquinones. Thus there may be obtained acidyl derivatives, containing free amino groups, of 1,4,5 - triamino - anthraquinone, 1,4,5,8 - tetra-amino-anthraquinone and of substituted amino-anthraquinones, for example 1,5-diamino-4,8-dioxy, 1,8-diamino-4,5-dioxy, 1,4-diamino-5-dioxy, 1,4-diamino-5,8-dioxy, 1,4,5-triamino-8-oxy and 1,4-diamino-5-oxy-6-chlor-anthraquinones. The acidyl derivatives produced may be acetyl compounds or may be propionyl or butyryl or other lower fatty acidyl derivatives.

What we claim and desire to secure by Letters Patent is:—

1. Process for the manufacture of an anthraquinone derivative containing both a free amino group and an acidylamino group in which the acidyl radical corresponds to an aliphatic monocarboxylic acid containing from two to four carbon atoms, which comprises converting the corresponding di- or poly-amino-anthraquinone into a compound containing both said acidylamino and free amino groups by a process comprising an acidylation step, the only acidyl groups introduced into the anthraquinone compound throughout the manufacturing corresponding to said aliphatic monocarboxylic acid.

2. Process for the manufacture of an anthraquinone derivative containing both a free amino group and an acidylamino group in which the acidyl radical corresponds to an aliphatic monocarboxylic acid containing from two to four carbon atoms, which comprises acidylating the corresponding di- or poly-amino-anthraquinone into a compound containing both said acidylamino and free amino groups, the only acidyl groups introduced into the anthraquinone compound throughout the manufacture corresponding to said aliphatic monocarboxylic acid.

3. Process for the manufacture of an anthraquinone derivative containing both a free amino group and an acidylamino group in which the acidyl radical corresponds to an aliphatic monocarboxylic acid containing from two to four carbon atoms, which comprises acidylating the corresponding di- or poly-amino-anthraquinone to beyond the desired stage, and reducing the acidyl content of the compound formed to the desired value by hydrolysis, the only acidyl groups introduced into the anthraquinone compound throughout the manufacture corresponding to said aliphatic monocarboxylic acid.

4. Process for the manufacture according to claim 3, wherein the amino-anthraquinone employed as starting material contains α-amino groups.

5. Process for the manufacture according to claim 3, wherein the amino-anthraquinone employed as starting material is 1,4-diamino-anthraquinone.

6. Process for the manufacture of monoacetyl-1,4-diamino-anthraquinone, which comprises acetylating 1,4-diamino-anthraquinone to produce 1,4-diacetylamino-anthraquinone, and hydrolyzing the same to produce the monoacetyl-1,4-diamino-anthraquinone.

7. Process for the manufacture of an anthraquinone derivative containing both a free amino group and an acidylamino group in which the acidyl radical corresponds to an aliphatic monocarboxylic acid containing from two to four carbon atoms, which comprises partially acidylating the corresponding di- or poly-amino-anthraquinone by means of the free acid as the sole acidylating agent to produce said anthraquinone derivative.

8. Process for the manufacture according to claim 7, wherein the amino-anthraquinone employed as starting material contains α-amino groups.

9. Process for the manufacture according to claim 7, wherein the amino-anthraquinone employed as starting material is 1,4-diamino-anthraquinone.

10. Process for the manufacture of monoacetyl-1,4-diamino-anthraquinone, which comprises partially acetylating 1,4-diamino-anthraquinone by means of glacial acetic acid as the sole acetylating agent to produce the monoacetyl-1,4-diamino-anthraquinone.

GEORGE REEVES.
HENRY CHARLES OLPIN.
GEORGE HOLLAND ELLIS.